(12) United States Patent
Becker

(10) Patent No.: US 6,205,629 B1
(45) Date of Patent: Mar. 27, 2001

(54) LATCH SENSING SEATBELT BUCKLE

(75) Inventor: David L. Becker, White Lake, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/354,652

(22) Filed: Jul. 16, 1999

(51) Int. Cl.$^7$ ............................. A44B 11/26; B60R 22/00
(52) U.S. Cl. ............................. 24/633; 24/303; 24/603; 24/645
(58) Field of Search ............................. 24/633, 303, 603, 24/645

(56) References Cited

U.S. PATENT DOCUMENTS

| | | |
|---|---|---|
| 5,060,977 | 10/1991 | Saito . |
| 5,406,252 | 4/1995 | Dear . |
| 5,704,099 * | 1/1998 | Cahill ........................ 24/633 |
| 5,742,986 | 4/1998 | Corrion et al. . |
| 5,752,299 | 5/1998 | Vivacqua et al. . |
| 5,781,971 * | 7/1998 | Petersen, III ................ 24/633 |
| 5,839,174 | 11/1998 | Chamings et al. . |
| 5,898,366 * | 4/1999 | Brown et al. ................ 24/633 |
| 5,907,892 * | 6/1999 | Todd ........................ 24/633 |
| 5,966,784 * | 10/1999 | Arbogast et al. ............ 24/633 |

FOREIGN PATENT DOCUMENTS

| | | |
|---|---|---|
| 3432088 | 2/1985 | (DE) . |
| 62-189250 | 12/1987 | (JP) . |

* cited by examiner

*Primary Examiner*—Victor N. Sakran
(74) *Attorney, Agent, or Firm*—Tarolli, Sundheim, Covell, Tummino & Szabo LLP

(57) ABSTRACT

A ferromagnetic latch (42) is moveable from a first position to a second position in which the latch locks a lockable element (16) against movement in a passage (22) in a buckle (12). The buckle (12) also includes a switch (60) which includes a ferromagnetic support member (62). The switch (60) also includes a ferromagnetic flux collecting member (70), a Hall effect device (72), and a magnet (74) fixed to the support member (62). The magnet (74) creates a magnetic field that is conducted by the flux collecting member (70) and the latch (42) away from the Hall effect device (72) when the latch is in the first position. The magnetic field is conducted by the flux collecting member (70) and the support member (62) towards the Hall effect device (72) when the latch (42) is moved away from the switch (60) to the second position. The Hall effect device (72) senses a first flux density when the latch (42) is in the first position which causes the Hall effect device (72) to provide a first output signal. The Hall effect device (72) senses a second flux density when the latch (42) is in the second position which causes the Hall effect device to provide a second output signal.

4 Claims, 2 Drawing Sheets

LATCH SENSING SEATBELT BUCKLE

FIELD OF THE INVENTION

The present invention relates to a seatbelt buckle. In particular, the present invention relates to a seatbelt buckle including a Hall effect device for sensing when the buckle is in a latched condition.

BACKGROUND OF THE INVENTION

A seatbelt system for restraining a vehicle occupant typically includes seatbelt webbing, a lockable element on the webbing, and a seatbelt buckle. The lockable element on the webbing is inserted in the buckle when the webbing has been placed about a vehicle occupant. A latch mechanism in the buckle interlocks with the lockable element to secure the webbing about the occupant. Such a seatbelt system may also include a Hall effect device for indicating whether or not the lockable element is locked in the buckle.

SUMMARY OF THE INVENTION

In accordance with the present invention, an apparatus comprises a lockable element and a buckle. The buckle includes a base that defines a passage for receiving and locking the lockable element in the buckle, a housing and a ferromagnetic latch. The latch is moveable from a first position to a second position in which the latch locks the lockable element against movement in the passage. The buckle also includes a switch which includes a ferromagnetic support member that is mountable within the housing. A ferromagnetic flux collecting member, a Hall effect device, and a magnet are fixed to the support member.

The magnet creates a magnetic field that is conducted by the flux collecting member and the latch away from the Hall effect device when the latch is in the first position. The magnetic field is conducted by the flux collecting member and the support member towards the Hall effect device when the latch is moved away from the switch to the second position. The Hall effect device senses a first flux density when the latch is in the first position which causes the Hall effect device to provide a first output signal. The Hall effect device senses a second flux density when the latch is in the second position which causes the Hall effect device to provide a second output signal.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIGS. 3 and 4 are views similar to FIG. 2 showing parts in different positions;

DESCRIPTION OF PREFERRED EMBODIMENTS

Figure 1:
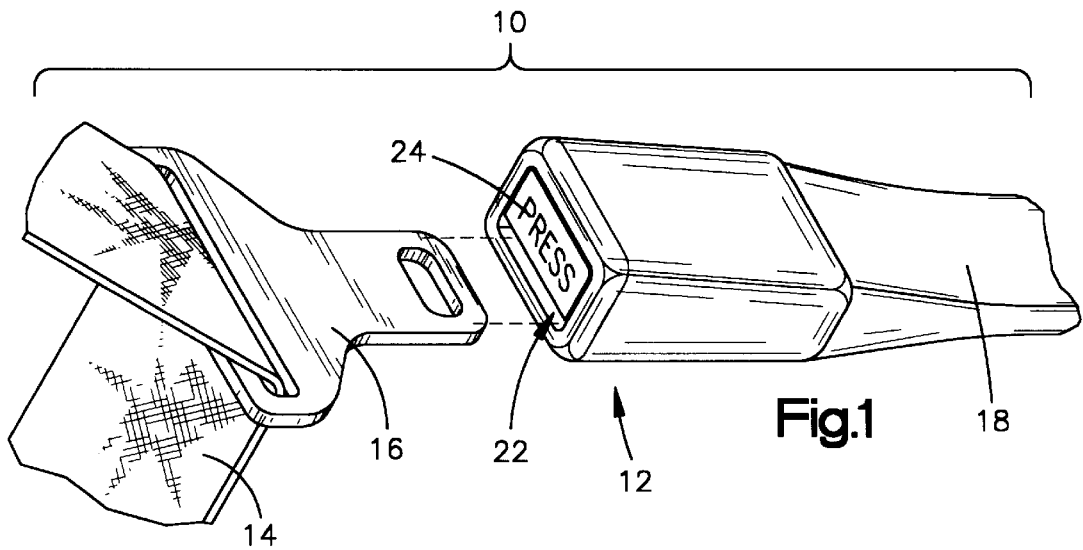
FIG. 1 is an isometric view of a vehicle occupant restraint apparatus comprising an embodiment of the present invention.

A vehicle occupant restraint apparatus 10 is shown in FIG. 1. The apparatus 10 includes a seatbelt buckle 12, seatbelt webbing 14, and a lockable element 16 on the webbing 14. The buckle 12 is anchored in a vehicle in a known manner, such as by a cable or anchor strap (not shown) extending within a cover 18. A latch mechanism 20 (shown schematically in FIGS. 2–4) locks the lockable element 16 in the buckle 12 when the lockable element 16 is inserted into the buckle 12 through an opening 22 at the end of the buckle 12. The lockable element 16 is subsequently released from the buckle 12 upon depression of a pushbutton 24 adjacent to the opening 22.

Figure 2:
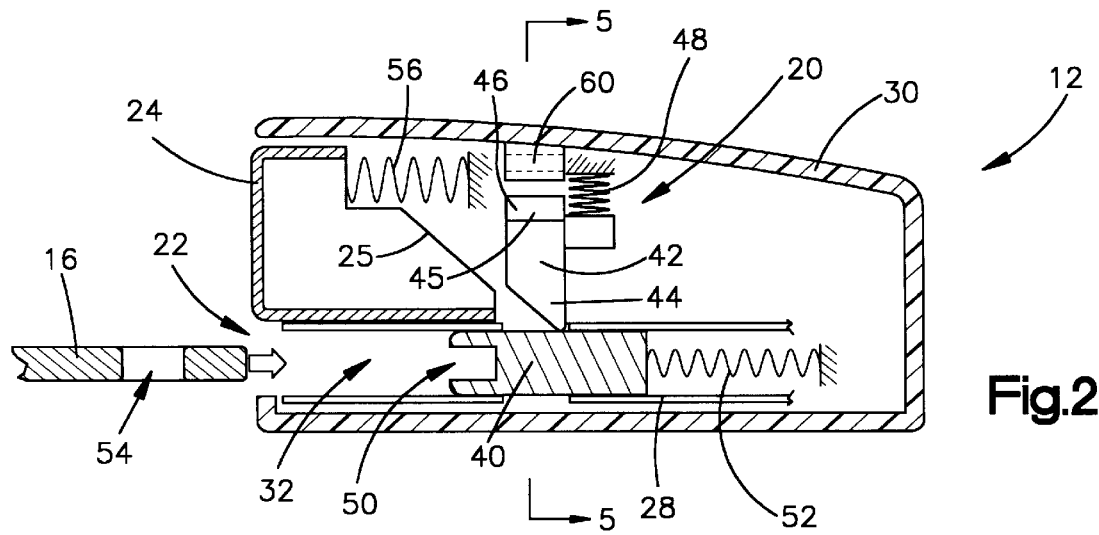
FIG. 2 is a schematic sectional view of parts of the apparatus of FIG. 1.
Figure 3:
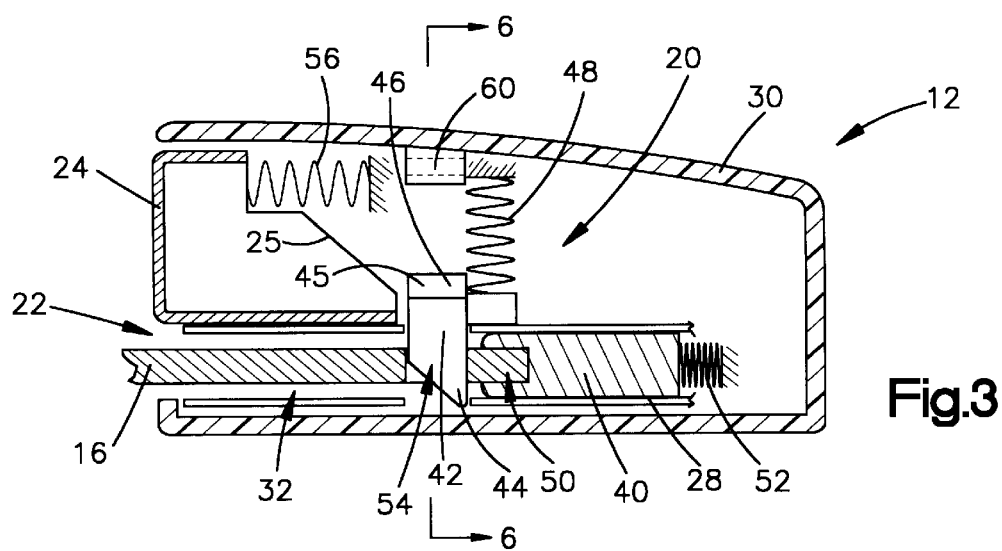

As shown in FIGS. 2–4, the buckle 12 includes a base 28 disposed within a housing 30. The base 28 supports the latch mechanism 20 within the housing 30, and defines a passage 32 that receives the lockable element 16.

The latch mechanism 20 may comprise any suitable structure capable of releasably interlocking with the lockable element 16. As shown by way of example in FIGS. 2–4, the latch mechanism 20 has a plurality of known parts including the pushbutton 24, an ejector 40, and a latch 42. The latch 42 is made of a ferromagnetic material and includes a first end portion 44 opposite a second end portion 46. The latch 42 is movable between a non-locking position (FIG. 2) and a locking position (FIG. 3). A latch spring 48 engages the latch 42 and biases it toward the passage 32. The ejector 40 holds the latch 42 in the non-locking position against the bias the latch spring 48.

When the lockable element 16 is inserted through the opening 22, as indicated by the arrow shown in FIG. 2, it is moved into engagement with the ejector 40 in a notch 50 at the end of the ejector 40. The lockable element 16 is then moved inward against the ejector 40 so as to push the ejector 40 along the passage 32 from a forward position (FIG. 2) to a rearward position (FIG. 3) against the bias of an ejector spring 52.

As the lockable element 16 and the ejector 40 approach the positions of FIG. 3, an aperture 54 in the lockable element 16 moves into alignment with the latch 42. The latch spring 48 then moves the latch 42 downward to the locking position through the aperture 54 in the lockable element 16 so that the first end portion 44 of the latch 42 blocks removal of the lockable element 16 from the buckle 12.

When the lockable element 16 is to be released from the buckle 12, the pushbutton 24 is moved from the position of FIG. 3 to the position of FIG. 4 against the bias of a pushbutton spring 56. As illustrated in FIGS. 2–4, the pushbutton 24 includes a cam surface 25 that engages with flanges 45 located at the second end portion 46 of the latch 42 to move the latch 42 out of the aperture 54 in the lockable element 16 against the bias of the latch spring 48. The ejector spring 52 then moves the ejector 40 outward along the passage 32 toward the opening 22 to eject the lockable element 16 from the buckle 12 as shown by the arrow in FIG. 4.

Figure 5:
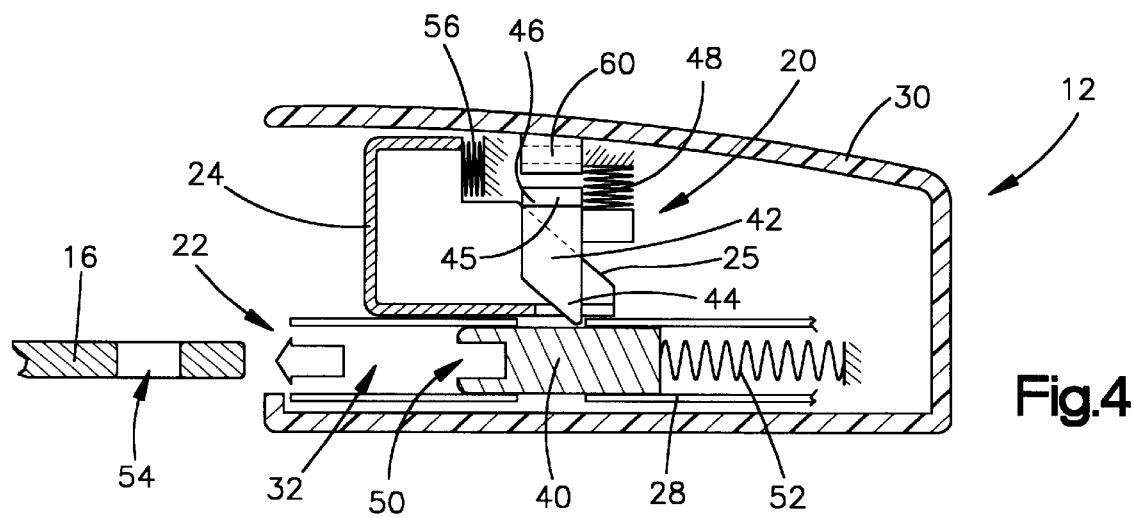
FIG. 5 is an enlarged sectional view taken along line 5—5 in FIG. 2 with certain parts omitted.
Figure 6:
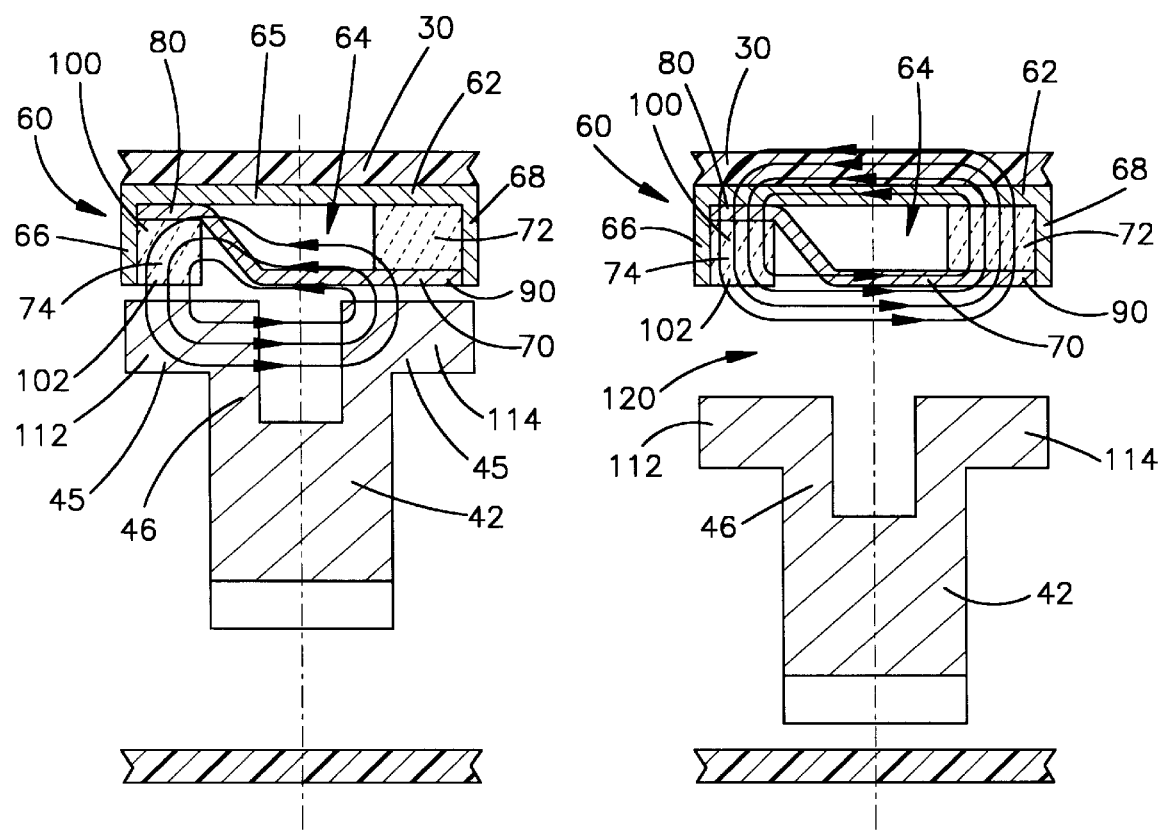
FIG. 6 is an enlarged sectional view taken along line 6—6 in FIG. 3 with certain parts omitted.

A switch 60 (FIGS. 2–4) is supported within the housing 30. As illustrated in FIGS. 5 and 6, the switch 60 includes a support member 62, a flux collecting member 70, a Hall effect device 72, and a magnet 74. The support member 62 is mounted within the housing 30 and is located above the latch 42. The support member 62 is made of a ferromagnetic material and includes a base 65 and first and second opposite side walls 66 and 68 which form a U-shaped channel 64. The flux collecting member 70, Hall effect device 72, and magnet 74 are secured within the channel 64 by known means such as an adhesive.

A first end portion 80 of the flux collecting member 70 is positioned adjacent to the intersection of the first side wall 66 and the base 65 of the support member 62 and extends along the base 65. The flux collecting member 70 extends diagonally from the first end portion 80 across the channel 64 to a second end portion 90 located adjacent to the second side wall 68. The second end portion 90 is spaced apart from and positioned parallel to the base 65.

The magnet 74 is disposed within the channel 64 adjacent to the first side wall 66 and the first end portion 80 of the flux collecting member 70. In the illustrated embodiment, a south pole 100 of the magnet 74 is disposed adjacent to the first end portion 80. The magnet 74 includes a north pole 102 opposite the south pole 100. The Hall effect device 72 is disposed between the base 65 of the support member 62 and the second end portion 90, adjacent to the second side wall 68.

When the latch 42 is in the non-locking position of FIG. 2, the flanges 45 are positioned adjacent to the switch 60. This is best shown in the enlarged view of FIG. 5. In this arrangement, a first flange 112, a second flange 114, and the flux collecting member 70 define a path for conducting a magnetic field between the north and south poles 102 and 100 of the magnet 74. This magnetic field is indicated generally by the arrows shown in FIG. 5.

In the non-locking position, the second end 90 of the flux collecting member 70 is positioned adjacent to the second end 46 of the latch 42, particularly the second flange 114. The first flange 112 is positioned adjacent to the north pole 102 of the magnet 74. The south pole 100 of the magnet 74 is positioned adjacent to the first end 80 of the flux collecting member 70. The flanges 112 and 114 and the flux collecting member 70 create a low reluctance path for conducting the magnetic field between the north and south poles 102 and 100 of the magnet 74.

In the non-locking position, the magnetic field is conducted between the north and south poles 102 and 100 of the magnet 74 by the first and second flanges 112 and 114 and the flux collecting member 70. The flanges 112 and 114 and the flux collecting member 70 conduct the magnetic field away from the Hall effect device 72, as illustrated by the arrows in FIG. 5. Thus, the flux density of the magnetic field acting on the Hall effect device 72 in the non-locking position is relatively low. As a result, the Hall effect device 72 has a low (or off) condition with a corresponding low output when the lockable element 16 is not locked in the buckle 12.

As the lockable element 16 is inserted into the passage 32 and approaches the locking position of FIG. 3, the first and second flanges 112 and 114. remain spaced close to the switch 60. When the aperture 54 in the lockable element 16 becomes aligned with the latch 42, the latch 42 moves to the locking position of FIG. 3 and the flanges 112 and 114 become spaced apart from the switch 60. This is best shown in the enlarged view of FIG. 6.

In the locking position, there is an air gap 120 between the latch 42 and the switch 60 which increases the reluctance of the path for conducting the magnetic field through the first and second flanges 112 and 114. When the parts are in the position shown in FIG. 6, the flux collecting member 70 and the support member 62 create a low-reluctance path for conducting the magnetic field between the north and south poles 102 and 100 of the magnet 74. This magnetic field is indicated generally by the arrows shown in FIG. 6.

In the locking position, the magnetic field is conducted between the north and south poles 102 and 100 of the magnet 74 through a path defined by the support member 62 and the flux collecting member 70. The support member 62 and the flux collecting member 70 conduct the magnetic field towards the Hall effect device 72. The flux density of the magnetic field acting on the Hall effect device 72 in the locking position is relatively high. As a result, the Hall effect device 72 has a high (or on) condition with a corresponding high output when the lockable element 16 is locked in the buckle 12.

Thus, the Hall effect device 72 senses a first flux density of the magnetic field when the latch 42 is in the non-locking position (FIG. 5). The Hall effect device 72 senses a second flux density of the magnetic field, different than the first flux density, when the latch 42 is in the locking position (FIG. 6). As a result, the Hall effect device 60 is switched from a first condition with a first output to a second, different condition with a correspondingly different output upon locking of the lockable element 16 in the buckle 12 by the latch 42.

The switch 60 can be used to alert a vehicle occupant to the locked or unlocked condition of the lockable element 16 and buckle 12. For example, an audible alarm or a lamp on the vehicle instrument panel could be activated in response to the output of the Hall effect device 72 to alert a vehicle occupant if the lockable element 16 is not locked in the buckle 12.

The switch 60 can also be used to control one or more vehicle occupant protection devices. For example, the switch 60 can be included in a deployment system with an inflatable vehicle occupant protection device. The switch 60 can be used to control the inflation of the protection device depending upon the buckled or unbuckled condition of the seatbelt. The inflatable device can be any one of several different types of inflatable vehicle occupant protection devices known in the art. Such inflatable devices include air bags, inflatable seatbelts, inflatable knee bolsters, inflatable head liners, and knee bolsters operated by air bags, and/or seatbelt pretensioners.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a lockable element;

a buckle for receiving and locking said lockable element in said buckle, said buckle comprising a housing, a base disposed within said housing, and a latch, said base defining a passage into which the lockable element is insertable, said latch being moveable from a first position to a second position in which said latch locks said lockable element against movement in said passage, said latch being made of a ferromagnetic material; and a switch for detecting when said latch locks said lockable element against movement in said passage, said switch comprising:

a support member made of a ferromagnetic material, said support member being mountable within said housing;

a flux collecting member made of a ferromagnetic material, said flux collecting member being fixed to said support member;

a Hall effect device fixed to said support member, said Hall effect device providing an output signal, the magnitude of which is dependent upon the flux density of a magnetic field acting on said Hall effect device; and a magnet fixed to said support member, said magnet creating a magnetic field conducted by said flux collecting member and said latch away from said Hall effect device when said latch is in said first position, said latch moving away from said switch when said latch moves to said second position, said magnetic field being conducted by said flux collecting member and said support member towards said Hall effect device when said latch is in said second position;

said Hall effect device sensing a first flux density of said magnetic field which causes said Hall effect device to provide a first output signal when said latch is in said first position;

said Hall effect device sensing a second flux density of said magnetic field, different than said first flux density, which causes said Hall effect device to provide a second output signal, different than said first output signal, when said latch is in said second position.

2. Apparatus as defined in claim 1 wherein said latch has first and second opposite end portions, said first end portion locking said lockable element against movement in said passage, said second end portion including flanges which conduct said magnetic field when said latch is in said first position.

3. Apparatus as defined in claim 1 wherein said lockable element is inserted into said passage in a first direction and said latch moves in a second direction, transverse to said first direction, to lock said lockable element against movement in said passage.

4. Apparatus as defined in claim 3 wherein said latch moves away from said switch in said second direction.

* * * * *